A. BAYLEY.
MAKING TEA AND COFFEE POT BODIES, &c.
No. 181,815. Patented Sept. 5, 1876.
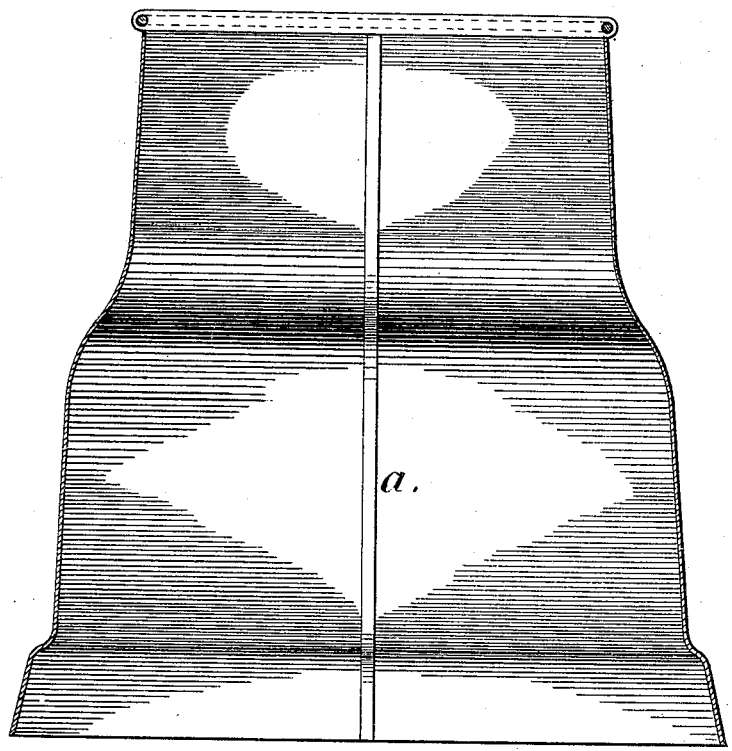
Witness
Horace Harris
George Fleming
Inventor
Alfred Bayley

UNITED STATES PATENT OFFICE.

ALFRED BAYLEY, OF NEWARK, NEW JERSEY.

IMPROVEMENT IN MAKING TEA AND COFFEE POT BODIES, &c.

Specification forming part of Letters Patent No. 181,815, dated September 5, 1876; application filed April 25, 1876.

To all whom it may concern:

Be it known that I, ALFRED BAYLEY, of Newark, in the county of Essex and State of New Jersey, have invented a new Process of Manufacturing Tin-Plate Tea and Coffee Pot Bodies and Tea-Urns, of which the following is a specification:

My invention consists in the process of spinning tin-plate tea and coffee pot bodies and tea-urns into ogee or other similar ornamental forms, and of burnishing on a suitable chuck, after they have been put together, with one or more seams.

The figure is a sectional view of a body, after having been brought to a desired form.

In the manufacture of these tin-plate bodies, which is a separate branch, there has been a felt need of being able to work them up in ornamental shapes, either as plain or planished goods. One mode has been adopted, viz., of making the body in two sections, which are struck up into the half form, and then the two are seamed together; but this is a matter of increased expense, and the seams were in the way of burnishing the goods.

To meet the demand in this department of manufacture is the object of my invention. My process then is to cut the tin-plate and form it into a truncated cone-shaped body. This body is put on a prepared chuck, prepared with the desired forms, and with a groove for the seam a, or seams, of the body to press into. The body is then spun into form on the chuck and burnished on the same. The seam, pressing into the groove, does not interfere with the spinning or burnishing.

In this way I take the common tin-plate and work it into the ornamental forms of the soft metals, making the tin a good imitation of the higher-priced goods, and at a greatly-reduced cost.

The spinning is not new of bodies made of soft metal, but the two are distinct branches of manufacture, and subject to different rules. These bodies have an additional benefit for the trade, as they will be made up separately from the top and bottom, and packed into each other and shipped to tinners over the country at a greatly-reduced cost of transportation, who will readily put them in shape for use in their shops in localities where the spinning could not be done.

If these bodies are made of sheet-iron and then tinned afterward the process would be really the same. These bodies will usually be spun into form on the chuck, and burnished after on the same chuck.

I claim—

The process herein described of manufacturing tin-plate tea and coffee pot bodies and tea-urns, consisting of forming them first into seamed truncated cones, and then of spinning them into any desired form, and burnishing them on a suitable chuck, substantially as and for the purposes specified.

ALFRED BAYLEY.

Witnesses:
HORACE HARRIS,
GEORGE CUMING.